US011113897B2

(12) United States Patent
Gupta et al.

(10) Patent No.: US 11,113,897 B2
(45) Date of Patent: Sep. 7, 2021

(54) SYSTEMS AND METHODS FOR PRESENTATION OF AUGMENTED REALITY SUPPLEMENTAL CONTENT IN COMBINATION WITH PRESENTATION OF MEDIA CONTENT

(71) Applicant: Rovi Guides, Inc., San Jose, CA (US)

(72) Inventors: Vikram Makam Gupta, Bangalore (IN); Harsha Neerakani, D.K District (IN); Nimit Dineshbhai Kalaria, Rajkot (IN)

(73) Assignee: ROVI GUIDES, INC., San Jose, CA (US)

(*) Notice: Subject to any disclaimer, the term of this patent is extended or adjusted under 35 U.S.C. 154(b) by 0 days.

(21) Appl. No.: 16/674,836

(22) Filed: Nov. 5, 2019

(65) Prior Publication Data
US 2020/0074751 A1 Mar. 5, 2020

Related U.S. Application Data

(63) Continuation of application No. 15/797,509, filed on Oct. 30, 2017, now abandoned.

(51) Int. Cl.
*G06T 19/20* (2011.01)
*H04N 21/462* (2011.01)
(Continued)

(52) U.S. Cl.
CPC ............ *G06T 19/20* (2013.01); *G06T 19/006* (2013.01); *H04N 21/4122* (2013.01);
(Continued)

(58) Field of Classification Search
CPC ... G06K 9/00671; G06T 19/006; G06T 19/20; G06T 2219/2004; G09G 2320/028;
(Continued)

(56) References Cited

U.S. PATENT DOCUMENTS 8,576,276 B2 * 11/2013 Bar-Zeev .............. G06T 19/006
348/53
2011/0214044 A1 * 9/2011 Davis ...................... G06T 11/80
715/201

(Continued)

OTHER PUBLICATIONS

YouTube video on AR Dragon: New Augmented Reality Pet Simulator, Sep. 20, 2017. https://www.youtube.com/watch?v=6xk1d63uQgU (Year: 2017).*

*Primary Examiner* — Sing-Wai Wu
(74) *Attorney, Agent, or Firm* — Haley Guiliano LLP

(57) ABSTRACT

Systems and methods are provided herein for providing supplemental Augmented Reality (AR) content. Media content is provided to a user device located within a viewing area. A determination is made that a supplemental three dimensional (3D) AR content related to the media content is available. 3D characteristics of the supplemental AR content are determined. Such characteristics include a viewing angle and body position of an actor from the supplemental AR content. 3D characteristics of the viewing area are determined. Such characteristics include shape and position of the furniture within the viewing area and a position of a user within the viewing area. A position is determined within the viewing area by comparing the 3D characteristics of the supplemental AR content and the 3D characteristics of the viewing area. The supplemental AR content is then provided for display at the determined position.

18 Claims, 10 Drawing Sheets

(51) Int. Cl.

| | |
|---|---|
| *H04N 21/41* | (2011.01) |
| *H04N 21/431* | (2011.01) |
| *H04N 21/4722* | (2011.01) |
| *H04N 21/45* | (2011.01) |
| *H04N 21/43* | (2011.01) |
| *H04N 21/472* | (2011.01) |
| *G06T 19/00* | (2011.01) |
| *H04N 21/234* | (2011.01) |
| *H04N 21/482* | (2011.01) |
| *G06K 9/00* | (2006.01) |
| *H04N 21/475* | (2011.01) |

(52) U.S. Cl.
CPC ..... *H04N 21/4126* (2013.01); *H04N 21/4307* (2013.01); *H04N 21/4312* (2013.01); *H04N 21/4524* (2013.01); *H04N 21/4532* (2013.01); *H04N 21/4622* (2013.01); *H04N 21/4722* (2013.01); *H04N 21/47214* (2013.01); *G06K 9/00671* (2013.01); *G06T 2219/2004* (2013.01); *G09G 2320/028* (2013.01); *H04N 21/23418* (2013.01); *H04N 21/4756* (2013.01); *H04N 21/4821* (2013.01)

(58) Field of Classification Search
CPC ......... H04N 21/23418; H04N 21/4122; H04N 21/4126; H04N 21/4307; H04N 21/4312; H04N 21/4524; H04N 21/4532; H04N 21/4622; H04N 21/47214; H04N 21/4722; H04N 21/4756; H04N 21/4821
See application file for complete search history.

(56) References Cited

U.S. PATENT DOCUMENTS

2012/0264510 A1* 10/2012 Wigdor ................. A63F 13/533
　　　　　　　　　　　　　　　　　　　463/31
2017/0103576 A1* 4/2017 DeFaria ................. G06F 3/013

* cited by examiner

900

902 — Identify a Plurality of Respective Positions of a Plurality of Users within the Viewing Area;

904 — Determine a Plurality of Respective Placement Positions for the Supplemental 3D AR Content within the Viewing Area for Each User of the Plurality of Users

906 — Adjust Sound of the Supplemental 3D AR Content Based on the Plurality of Respective Placement Positions

908 — Simultaneously Provide the Supplemental 3D AR Content for Display at the Each of the Plurality of Placement Positions Simultaneously with Providing the Current Scene of the Media Content to the User Device

910 — Provide the Adjusted Sound of the Supplemental 3D AR Content Simultaneously with Providing the Current Scene of the Media Content to the User Device

1002 — Display a Prompt to the User to Pause the Media Content in Response to Determining that the Supplemental 3D AR Content Relates to the Current Scene of the Media Content 1004 — Pause the Providing of the Media Content 1006 — Provide the Supplemental 3D AR Content for Display before the Current Scene 1008 — Resume Providing of the Media at the Beginning of the Current Scene after the Supplemental AR Content Concludes

FIG. 10

SYSTEMS AND METHODS FOR PRESENTATION OF AUGMENTED REALITY SUPPLEMENTAL CONTENT IN COMBINATION WITH PRESENTATION OF MEDIA CONTENT

CROSS-REFERENCE TO RELATED APPLICATION

This application is a continuation of U.S. patent application Ser. No. 15/797,509, filed Oct. 30, 2017 (now allowed), which is hereby incorporated by reference herein in its entirety.

BACKGROUND

A typical television system may have an ability to present media content to the user's display (e.g., a TV set) and present supplemental information relating to that media content using the same display. This can be accomplished either by presenting the media content and the supplemental information sequentially, or using picture-in-picture technology. However, both approaches are not ideal. The sequential approach increases the viewing time and fails to match the supplemental content with the media content in any way. The picture-in-picture approach covers a portion of the media content, or decreases the size of a viewing window, leading to a loss in video fidelity. Some television systems may provide supplemental information using Augmented Reality (AR) technology. However, typical AR television systems only provide supplemental information on pre-designated surfaces, and fail to provide supplemental information in a way that matches conditions of the room and positions of the users within the room, leading to a sub-optimal user experience.

SUMMARY

Systems and methods are disclosed herein for an improved method for providing supplemental three-dimensional (3D) augmented reality (AR) content simultaneously with providing two-dimensional (2D) media content. For example, a 2D movie may be provided on a display in a room, and at the same time, a system may determine that related 3D augmented reality content is available. The media guidance application may then analyze 3D features of the AR content and 3D features of the room where the 2D media content is provided. The system may then provide AR content in an advantageous position within the room, such that the user may see both the a 2D movie and the AR content that is overlaid over a piece of real physical furniture.

To this end and others, in some embodiments, a media guidance application provides media content to a user device located within a viewing area. In some embodiments, the media guidance application may provide a movie or a TV show to a user's television located within a viewing area. For example, the media guidance application may display a movie on a TV screen located in the user's living room.

In some embodiments, the media guidance application may determine that supplemental three-dimensional (3D) augmented reality (AR) content related to the media content is available. For example, the media guidance application may determine that it has access to a movie commentary that relates to the movie that is being shown. In some embodiments, the media guidance application may have AR display capabilities. That is, the media guidance application may be able to overlay the supplemental content over the real-life 3D environment of the viewing area using, for example, 3D projection goggles worn by the user.

In some embodiments, the media guidance application may determine 3D characteristics of the supplemental AR content. In particular, the media guidance application may determine a viewing angle of an actor in the supplemental content. For example, the media guidance application may determine from which angle the actor in the supplemental AR content may be viewed. In some embodiments, supplemental AR content was created from an original 2D supplemental content, with 3D models being created by interpolation from 2D images. Such content may have severely limited viewing angles. That is, the media guidance application may determine that supplemental AR content may only be viewed from substantially the same angle from which the original 2D supplemental content was filmed. In some embodiments, the supplemental AR content may comprise true 360-degree 3D models. While such content may, theoretically, be viewed from any angle, the media guidance application may still determine preferred viewing angles for such content. For example, the media guidance application may determine from which angles a face of an actor in the supplemental AR content would be visible, because angles where such a face is not visible may not be interesting to the user.

In some embodiments, the media guidance application may determine 3D characteristics of the supplemental AR content by determining the body position of an actor (or actors) in the supplemental AR content. In some embodiments, the media guidance application may identify positions of the body trunk, limbs, and head of the actor in relation to one another. For example, the media guidance application may assign skeletal mapping points to body parts of the actor. In some embodiments, the media guidance application may assign skeletal mapping points, respectively, to the head, neck, center of the body, hands, wrists, shoulders, hips, knees, ankles and feet of the actor in the supplemental AR content. In some embodiments, more or fewer skeletal mapping points may be used. Together, skeletal mapping points may accurately reflect the body position of the actor by tracking angles of key joints of the human body. For examine, a sitting actor would have a certain configuration of skeletal mapping points (e.g., hip, knee, and foot mapping points may form a substantially right angle). In another example, a standing actor would have certain different configuration of skeletal mapping points (e.g., hip, knee, and foot mapping point may form a substantially straight line).

In some embodiments, the media guidance application may also determine 3D characteristics of the viewing area including shape and position of the furniture within the viewing area. In some embodiments, the media guidance application may identify (e.g. using a camera or another sensor), presence of furniture pieces in the viewing area. For example, the media guidance application may use a combination of cameras to determine that a single TV set, two chairs and a sofa are present in the living room of a user. In another embodiment, the media guidance application may receive a map of the living room as an input from the user. In some embodiments, the media guidance application may then analyze relative positions of the furniture pieces. That is, the media guidance application may determine the rotational angles of the furniture and their distance in relation to one other. For example, the media guidance application may determine that the TV set is located near the back wall of the living room and that the chairs and the sofa are located at certain respective distances from the TV screen and at certain respective angles.

In some embodiments, the media guidance application may also determine shape of each piece of furniture. For example, the media guidance application may assign furniture mapping points to each piece of furniture. For example, the media guidance application may assign furniture mapping points to each leg of a chair, each corner of the seat of the chair, and each corner of the back of the chair. In some embodiments, more or fewer furniture mapping points may be used. In some embodiments, the media guidance application may use so many furniture mapping points as to create a full mesh representation of each furniture piece.

In some embodiments, the media guidance application, may also determine a position of a user (or multiple users) within the viewing area. For example, the media guidance application may use one or more video sensors to locate users within the viewing area and determine their angles and distance with respect to each and with respect to each piece of furniture that was previously identified. In some embodiments, the media guidance application may also determine the body position of the user (or users) detected in the viewing area. For example, the media guidance application may determine skeletal mapping points for each user.

In some embodiments, the media guidance application may determine a position (e.g., a placement position for supplemental AR content) within the viewing area by comparing the 3D characteristics of the supplemental AR content and the 3D characteristics of the viewing area. For example, the media guidance application may match body position of an actor in the supplemental AR content with positions of the users in the users in the area, and match the body positions of the actor with shape and positions of the furniture. For example, the media guidance application may determine that the body shape of an actor would match a mesh of chair located next to the TV screen. That is, an actor could be displayed as sitting in that chair. Furthermore, the media guidance application may determine that the viewing angle of the actor matches with an angle of the user in relation to that chair. In this situation, the media guidance application may identify the position as the place where that chair is standing.

In some embodiments, the media guidance application may match the lighting conditions in the supplemental AR content with lighting conditions within the viewing area. For example, if an actor in the supplemental AR content is dimly lit, the media guidance application may identify a dim part of the viewing area as the position where the supplemental AR content should be played. In another example, when an actor in the supplemental AR content is brightly lit, the media guidance application may identify a well-lit part of the viewing area as the position where the supplemental AR content should be played.

In some embodiments, the media guidance application may provide supplemental 3D AR content for display at the determined position. For example, the media guidance application may display a 3D avatar of an actor from the supplemental content as appearing in the chair, such that the body position of the actor matches the shape of the chair, and such that the viewing angle of the actor matches the viewing angle of the user (e.g., the actor a face is visible to the user from the user's position).

In some embodiments, the media guidance application may provide media content to a user device located within a viewing area. A viewing area may include any area from which a user can see the provided media content and areas adjacent to the area from which a user can see the provided media content. In some embodiments, the media guidance application may provide a movie or a TV show to user's display (e.g., a TV set) located within a viewing area. For example, the media guidance application may display a movie on a TV screen located in the user's living room.

In some embodiments, the media guidance application may determine whether a supplemental 3D AR content relates to a current scene of the media content by comparing metadata associated with the supplemental AR content and metadata associated with the current scene of the media content. For example, the media guidance application may evaluate the metadata information that identifies the title, genre, scene description of the media content, actors participating in the media content, closed captions related to specific scenes of the media content, any other type of metadata, or any combination thereof. In some embodiments, the media guidance application may also evaluate the metadata of available supplemental AR content. For example, metadata may list the title of the related media content, the actors present in the supplemental AR content, genre description, identification of a specific scene in the media content, any other type of metadata, or any combination thereof. For example, if the user is watching the "Matrix" movie, the media guidance application may determine that "Matrix actor/director commentary" supplemental AR content is related to the "Matrix" movie that the user is watching.

In some embodiments, the media guidance application may analyze metadata specifically related to a particular scene (e.g., the current scene) of the media content. For example, each scene of the media content may have related metadata identifying, for example, title of the scene, type of the scene (action, conversation, exposition, panorama), actors present in the scene, any other type of metadata, or any combination thereof. In some embodiments, the media guidance application may match the particular scene of the media content to supplemental AR content based on comparing the metadata of that scene and metadata of the supplemental AR content. For example, "Neo Bullet-time Scene" from the "Matrix" movie can have associated metadata that identifies this scene (e.g., by title "Neo Bullet-time Scene"), metadata that identifies timing of that scene within the movie "Matrix" (e.g., "25 minutes 30 seconds-32 minutes 35 seconds"), and metadata that identifies actors involved in the scene (e.g., "Keanu Reeves"). Supplemental AR content may similarly include metadata like: title (e.g., "Lana Wachowski discusses Neo Bullet-time Scene"), subject matter (e.g., "Director commentary"), and/or timestamps identifying what part of the media content it's relevant to (e.g., "25 minutes 30 seconds-30 minutes 00 seconds"). In one example, the media guidance application may determine that supplemental AR content matches "Neo Bullet-time Scene" from the "Metrix" because the title of supplemental AR content matches the description of that scene. In one example, the media guidance application may determine that supplemental AR content matches the "Neo Bullet-time Scene" scene from the "Metrix" because it references the same actor (e.g., "Keanu Reeves") and the same time in the movie (e.g., "25 minutes 30 seconds.")

In some embodiments, the media guidance application may perform a series of steps in response to determining that the supplemental 3D AR content relates to the current scene of the media content. The series of steps may include determining 3D characteristics of the supplemental 3D AR content.

For example, the media guidance application may determine a viewing angle or angles of an actor in the supplemental AR content (e.g., all angles from which Keanu Reeves from "Keanu Reeves discusses Neo Bullet-time Scene" supplemental AR content may be viewed). In some embodiments, the media guidance application may also determine body position of the actor in the supplemental AR content (e.g., what is the body position of Keanu Reeves in "Keanu Reeves discusses Neo Bullet-time Scene" supplemental AR content).

In some embodiments, the media guidance application may determine 3D characteristics of the viewing area. In some embodiments, the media guidance application may determine shape and position of the furniture within the viewing area. For example, the media guidance application may identify locations and shapes of chairs, tables, TVs, TV stands, etc., within the viewing area. In some embodiments, the media guidance application may identify positions of a user or users within the viewing area. For example, the media guidance application may determine how far and at what angle the user is located in relation to the display and other furniture pieces in the viewing area.

The series of steps may also include the media guidance application determining a placement position for the supplemental 3D AR content within the viewing area. In some embodiments, this determination includes: matching the viewing angle of the supplemental 3D AR content with the position of the user within the viewing area; and matching the body position of an actor with the shape and position of the furniture within the viewing area. For example, the media guidance application may identify all sub-areas in the viewing area, where the viewing angle for Keanu Reeves from Keanu Reeves discusses Neo Bullet-time Scene" is compatible with the position of the user. In some embodiments, the media guidance application may then identify all furniture pieces in those sub-areas. In some embodiments, the media guidance application may then match the body position of Keanu Reeves in "Keanu Reeves discusses Neo Bullet-time Scene" supplemental AR content with the shape of each identified piece of furniture. The placement positions may be determined to be a location of the piece of furniture that matches the aforementioned criteria.

The method further includes providing the supplemental 3D AR content for display at the determined placement position simultaneously with providing the current scene of the media content to the user device. For example, a 3D avatar of Keanu Reeves from "Keanu Reeves discusses Neo Bullet-time Scene" may be provided for display as sitting in a chair in the living room simultaneously with the 2D "Matrix" movie being provided for display at the TV screen adjacent to the chair.

In some embodiments, the media guidance application may determine that there is no good placement position for the supplemental 3D AR content within the viewing area. For example, the media guidance application may determine that there is no position where both the viewing angle of the supplemental AR content matches the position of the user and where the body position of an actor matches with the shape and position of at least one furniture piece. In some embodiments, the media guidance application may, in response to determining that there is no good placement position for the supplemental 3D AR content within the viewing area, adjust the 3D characteristics of the supplemental AR content based on the determined characteristics of the viewing area. For example, the media guidance application may scale the size of an actor in the supplemental AR content. In this example, if the actor is too big to sit in a chair in the living room, the media guidance application may proportionally scale the actor in the supplemental AR content. In some embodiments, the media guidance application may adjust the viewing angle of the actor in the supplemental AR content, for example by rotating the actor from the supplemental AR content. For example, the media guidance application may rotate the actor within the supplemental AR content so that his viewing angle would match the position of the user in the viewing area. In some embodiments, the media guidance application may adjust the body position of the actor in the supplemental AR content. For example, if the actor is sitting, but no chairs are available in the living room, the media guidance application may modify the actor in the supplemental AR content to be standing.

In some embodiments, the media guidance application may adjust at least one of: the viewing angle, the body position of an actor to improve at least one of: the matching of the viewing angle of the supplemental 3D AR content with the position of the user within the viewing area, and the matching of the body position of an actor with the shape and position of the furniture within the viewing area.

In some embodiments, the media guidance application may prompt the user to adjust the position of the user within the viewing area when there is no good placement position for the supplemental 3D AR content within the viewing area. For example, the media guidance application may determine that if the user would sat a different chair, his position would better match the viewing angle of an actor of the supplemental 3D AR content.

In some embodiments, the media guidance application may provide for display an AR phantom outline of a human body in a preferred position within the viewing area. For example, a phantom outline may be displayed as sitting on chair where the user should sit. The media guidance application may then prompt the user to physically match his position with the phantom outline.

In some embodiments, in response to determining that there is no good placement position for the supplemental AR content within the viewing area, the media guidance application may prompt the user to adjust the position of the furniture within the viewing area. For example, if the media guidance application determines that no piece of furniture matches the body positions of the actor in the supplemental AR content, the media guidance application may request that the user reposition a piece of furniture, or add a new piece of furniture to the viewing area. In some embodiments, the media guidance application may display an AR phantom outline of a furniture piece in a preferred position within the viewing area. For example, the media guidance application may use AR projection equipment to display a phantom outline of a chair in a preferred position within the viewing area. In some embodiments, the media guidance application may then prompt the user to match the position of a real piece of furniture with the phantom outline. For example, the media guidance application may ask the user to place a chair in a space where the phantom outline of a chair is shown.

In some embodiments, the media guidance application may identify a plurality of respective positions of a plurality of users within the viewing area. For example, if multiple users are present in the living room, the media guidance application may identify each user's position. In some embodiments, the media guidance application may then determine a plurality of respective placement positions for the supplemental 3D AR content within the viewing area for each user of the plurality of users. For example, each user may see supplemental 3D AR content in a different location. This is possible because each user may be using separate AR processing equipment (e.g., AR goggles). In some embodiments, the media guidance application may adjust the sound of the supplemental 3D AR content based on the plurality of respective placement positions. The sound adjustment may be necessary because, while each user can see his or her own version of supplemental 3D AR content, the sound equipment may be shared. In some embodiments, the media guidance application may simultaneously provide the supplemental 3D AR content for display at the each of the plurality of placement positions simultaneously with providing the current scene of the media content to the user device. For example, while the current scene is being played on the TV, each user may simultaneously be able to see supplemental 3D AR content in a different location. In some embodiments, the media guidance application may provide the adjusted sound of the supplemental 3D AR content simultaneously with providing the current scene of the media content to the user device. For example, the media guidance application may adjust sound in such a way that at each user would find the sound at least somewhat matching the respective position of where her or she sees the supplemental 3D AR content.

In some embodiments, the media guidance application may select supplemental AR content for display from the plurality of supplemental AR content files based on a user profile. For example, the media guidance application may have more than one supplemental AR content available for display that relates to the current scene. For example, a "Neo Bullet-time" scene in the "Matrix" movie may have more than one supplemental AR content that matches with it. For example, "Keanu Reeves explains Neo Bullet-time scene" supplemental AR content and "Lana Wachowski explains Neo Bullet-time scene" supplemental AR content may both match the "Neo Bullet-time" scene in the "Matrix" movie. In some embodiments, the media guidance application may examine user profiles for preferences, and match those preferences to metadata of the supplemental AR content. The media guidance application may then select the supplemental AR content based on the match. For example, the media guidance application may determine that the user is a fan of Keanu Reeves. In that case, the media guidance application may select the "Keanu Reeves explains Neo Bullet-time Scene" supplemental AR content over the "Lana Wachowski explains Neo Bullet-time Scene" supplemental AR content. In some embodiments, the media guidance application may also attempt to select a placement positions for supplemental AR content based on the user profile. For example, the media guidance application may attempt to place Keanu Reeves from "Keanu Reeves explains Neo Bullet-time Scene" supplemental AR content as close as possible to a user who is a fan of Keanu Reeves.

In some embodiments, the media guidance application may display a prompt to the user to pause the media content in response to determining that the supplemental 3D AR content relates to the current scene of the media content. For example, if the media guidance application determines that "Lana Wachowski explains Neo Bullet-time Scene" is relevant to "Neo Bullet-time Scene" of the "Matrix" movie, the media guidance application may prompt the user to pause the media content before "Neo Bullet-time Scene" is shown. In some embodiments, the media guidance application may, in response to receiving user response to the prompt, pause the providing of the media content before the current scene starts. In some embodiments, the media guidance application may then provide the supplemental AR content for display before providing the current scene. For example, the media guidance application may pause the playback of the 2D "Matrix" movie before the "Neo Bullet-time Scene," and provide for display the "Lana Wachowski explains Neo Bullet-time Scene" supplemental 3D AR content. In some embodiments, the media guidance application may resume providing of the media content at the beginning of the current scene after the supplemental AR content concludes. For example, once the "Lana Wachowski explains Neo Bullet-time Scene" supplemental 3D AR content concludes, the media guidance application may continue playback of the "Matrix" movie at the beginning of the "Neo Bullet-time Scene."

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 9 depicts an illustrative flow diagram for a process for providing adjusted sound of the supplemental AR content in accordance with some embodiments of the disclosure; and FIG. 10 depicts an illustrative flow diagram for a process for pausing the providing of the media content in accordance with some embodiments of the disclosure.

DETAILED DESCRIPTION

Figure 1A:
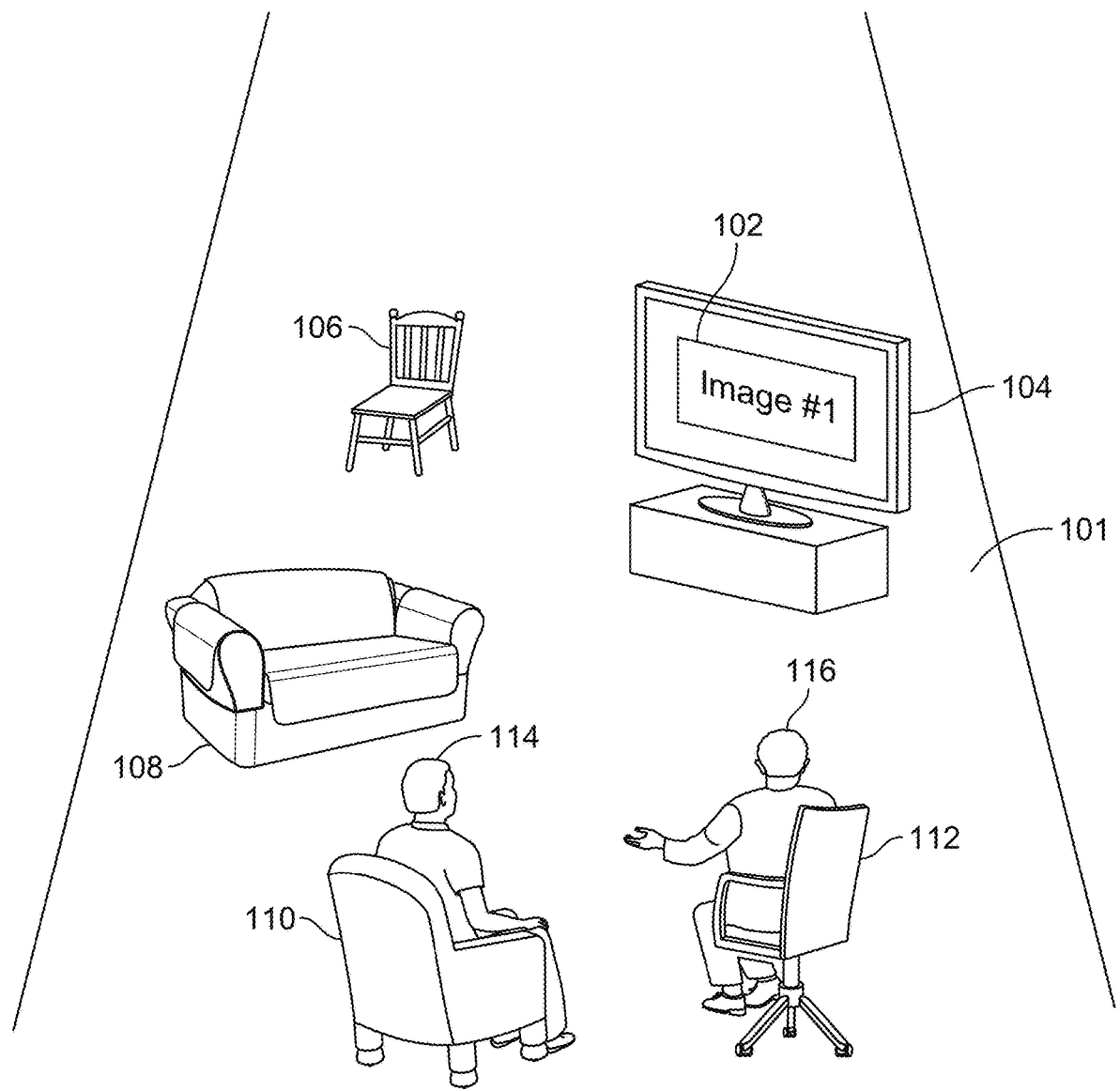
FIG. 1A shows an illustrative diagram of a viewing area where media content and supplemental AR content may be provided, in accordance with some embodiments of the disclosure.

Systems and methods are disclosed herein for an improved method for providing supplemental three-dimensional (3D) augmented reality (AR) content simultaneously with providing media content. The media guidance application may provide media content (e.g., a movie) on a TV screen of the user. The media guidance application may then determine that supplemental AR content (e.g., director commentary for the movie) is available that relates to the currently displayed scene of the media content. The media guidance application may then determine 3D characteristics of the supplemental AR content and 3D characteristics of the viewing area. The media guidance application may then determine a placement position for the supplemental AR content. For example, the media guidance application may find a placement position such that the user has a good viewing angle to see an actor from the supplemental AR content, and such that the body positions of the actor from the supplemental AR content matches a piece of furniture in the user's room. In another example, the media guidance application may find a placement position such that the lighting level of the supplemental AR content matches the lighting level of that part of the viewing area. Once the placement position is found, the media guidance application may place the actor from the supplemental AR content at the placement position and play the supplemental AR content in 3D while, at the same time, playing the original media content.

As referred to herein, the phrase "Augmented Reality" refers to any kind of display of media content that overlays a real-world environment. For example, augmented reality may be provided using goggles worn by a user. That is, the goggles may allow the user to partially see the real world, while some digitally produced content is overlaid, by the goggles, over the real-world objects. In some embodiments, Augmented Reality may also refer to holographic projection of media content that overlays real-world objects.

As referred to herein, the phrase "viewing area" refers to any kind of physical area, where display of media content may be viewed by one or more users, and physical areas that immediately adjoin such areas. For example, if the media content is displayed on a TV screen in a room, all parts of that room may be considered to be a "viewing area." In some embodiments, such viewing area may include areas where the media content is not visible. For example, areas behind or to the side of the TV screen can still be considered within the "viewing area."

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user assets, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, web-sites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

FIG. 1A shows an illustrative diagram of a viewing area where media content and supplemental AR content may be provided in accordance with various embodiments of the disclosure. In some embodiments, viewing area 100 includes display 104 that may display media content provided by the media guidance application. For example, display 104 may display image 102. Image 102 may be a part of media content provided by the media guidance application. In some embodiments, viewing area 100 may include chairs 106, 110, 112, and sofa 108. In some embodiments, viewing area 100 may include users 114 and 116.

In some embodiments, the media guidance application may determine that a supplemental AR content relate is available that is related to the media content provided on display 102. For example, display 102 may be showing a movie "Matrix," and the media guidance application may determine that supplemental content "Keanu Reeves discusses Neo Bullet-time Scene" is available. For example, the media guidance application may determine that metadata of the supplemental content "Keanu Reeves discusses Neo Bullet-time Scene" matches the metadata of the current scene (e.g., "Neo Bullet-time Scene") of the movie "Matrix" that is being displayed on display 104.

In some embodiments, supplemental AR content related to the media content may already be in 3D form. In some embodiments, supplemental AR content related to the media content may be in 2D form. In this case the media guidance application may transform the supplemental 2D AR content into supplemental 3D AR content by extrapolating available 2D information.

In some embodiments, the media guidance application may determine 3D characteristics of the supplemental AR content including a viewing angle and body position of an actor in the supplemental AR content. For example, the media guidance application may analyze from which angle an actor (e.g., Keanu Reeves) from supplemental AR content may be viewed. In some embodiments, the media guidance application may also analyze the body position of the actor.

In some embodiments, the media guidance application may also use one or more video sensors to determine 3D characteristics of the viewing area. For example, the media guidance application may determine positions of each piece of furniture in viewing area 100 (e.g., chairs 106, 110, and 112 and sofa 108) in relation to each other and to display 104. For example, for each piece of furniture, the media guidance application may determine its shape, and its angle and distance to other pieces of furniture. For example, in relation to chairs 106, the media guidance application may determine its shape and its distance and angles to chair 110, chair 112, sofa 108, and display 104.

In some embodiments, the media guidance application may also use one or more video sensors to determine position of all users within the viewing area. For example, the media guidance application may determine the positions of user 116 in relation to chair 106, chair 110, chair 112, sofa 108, and display 104. In some embodiments, the media guidance application may determine at which angle the user, in his current positions, can see each of the chairs 106, 110, 112, and 112, sofa 108 and display 104. Similar operating may be performed by the media guidance application for user 114.

In some embodiments, the media guidance application may determine a placement positions for an actor from the supplanted AR content. This functionality will be described more fully in connection with FIGS. 1B and 1C.

Figure 1B:
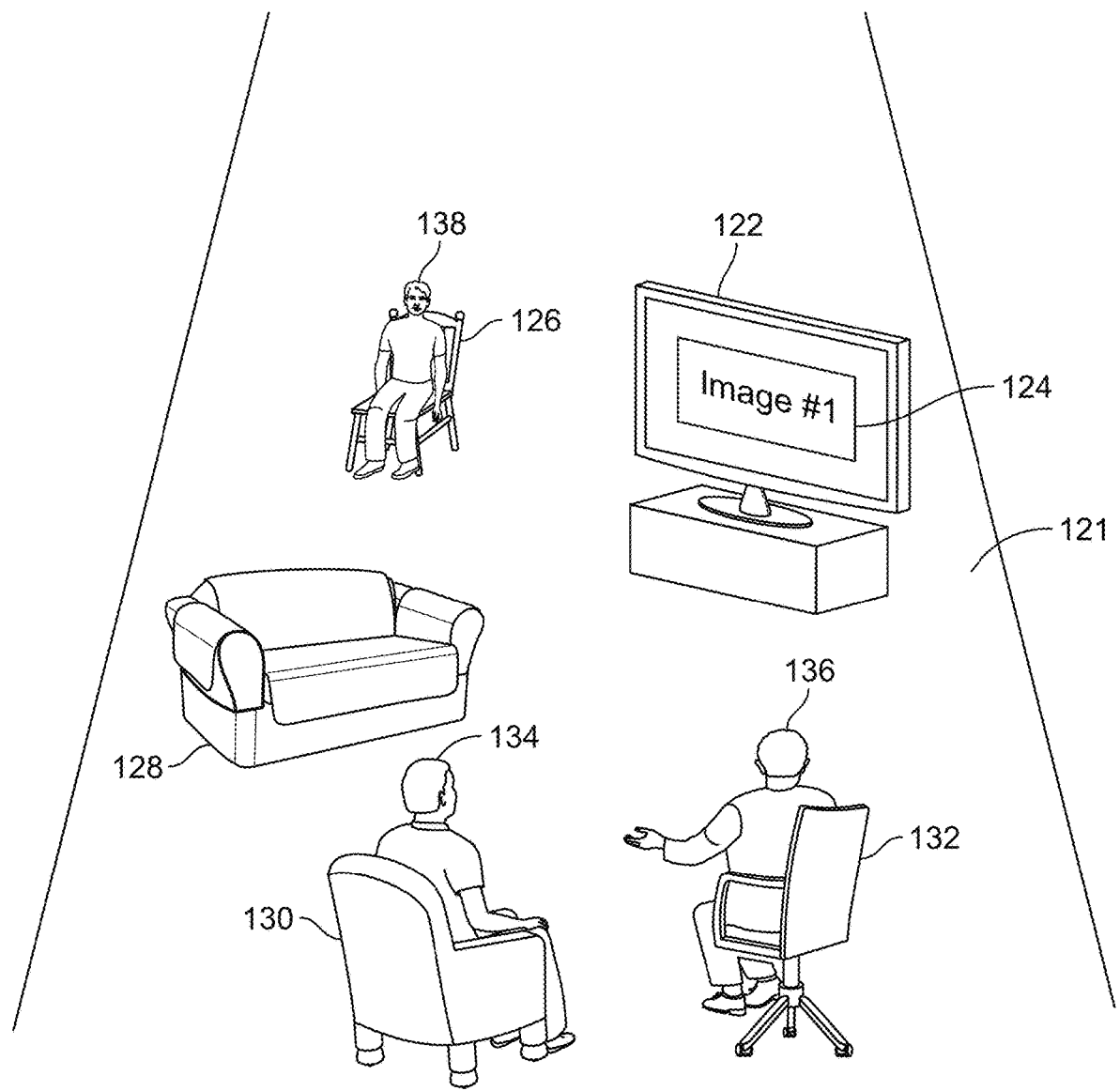
FIG. 1B shows another illustrative diagram of a viewing area where media content and supplemental AR content may be provided, in accordance with some embodiments of the disclosure.

FIG. 1B shows an illustrative diagram of a viewing area where media content and supplemental AR content may be provided in accordance with various embodiments of the disclosure. In some embodiments, viewing area 120 includes display 122 that may display media content provided by the media guidance application. For example, display 122 may display image 124. Image 124 may be a part of media content provided by the media guidance application. In some embodiments, viewing area 120 may include chairs 126, 130, 132 and a sofa 128. In some embodiments, viewing area 120 may include users 134 and 136. In some embodiments, viewing area 120 may correspond to viewing area 100; display 122 may correspond to display 104; chairs 126, 130, 132 and a sofa 128 may correspond to chairs 106, 110, 112 and a sofa 108; and users 134 and 136 may correspond to users 114 and 116.

In some embodiments, the media guidance application may determine a placement position for an AR image of actor 138 from the supplemental AR content, based on determining 3D characteristics of the supplemental AR content and the determined 3D characteristics of the viewing area. For example, the media guidance application may analyze the viewing angle of actor 138 of the supplemental AR content. For example, the media guidance application may determine from which angles actor 138 may be viewed. In some embodiments, supplemental AR content was created from an original two-dimensional (2D) supplemental content, with 3D images being created by interpolation from 2D images. Such content may have limited viewing angles. That is, the media guidance application may determine that actor 138 may only be viewed from substantially the same angle from which the original 2D supplemental content was filmed. In some embodiments, actor 138 may have an associated true 360-degree 3D content representation. While such content may, theoretically, be viewed from any angle, the media guidance application may still determine preferred viewing angles for such content. For example, the media guidance application may determine from which angles the face of actor 138 in the supplemental AR content would be visible. For example, the media guidance application may determine that actor 138 may be visible when actor 138 is viewed from a specific range of angles (e.g., −30 degrees to 30 degrees).

In some embodiments, the media guidance application may also determine the body position of actor 138. For example, the media guidance application may assign skeletal mapping points to body parts of actor 138. In some embodiments, the media guidance application may assign a skeletal mapping points respectively to the head, neck, center of the body, hands, wrists, shoulders, hips, knees, ankles and feet of actor 138 in the supplemental AR content. For example, the positions of the skeletal mapping points of actor 138 in relation to one other may define that actor 138 is in a sitting position with his body rotated by 5 degrees and arms pointed down.

In some embodiments, the media guidance application may also determine a shape for each piece of furniture (e.g., chairs 126, 130, and 132 and sofa 128). For example, the media guidance application may assign furniture mapping points to each piece of furniture. For example, the media guidance application may assign furniture mapping points to each leg of chair 126, each corner of the seat of chair 126, and each corner of the back of the chair 126. In some embodiments, the media guidance application may use so many furniture mapping points as to create a full mesh representation of chair 126.

In some embodiments, the media guidance application may also determine positions of the furniture within the viewing area 120. For example, the media guidance application may determine angles and distances between every pair-wise combination of furniture objects. For example, chair 130 may be 5 feet away from chair 138 and be at 20-degree angle, while chair 132 may be 7 feet away at 45-degree angle.

In some embodiments, the media guidance application may also determine positions of the user within viewing area 120. For example, the media guidance application may determine that user 136 is in chair 132, and that user 134 is in chair 130. In that case the position of user 132 may be set to be equal to the position of chair 132. In some embodiments, the media guidance application may determine that a user 136 is not in a position that is shared with a position of any furniture piece. In that case, the media guidance application may separately determine the position of user 136. That is, the media guidance application may determine distances and angles between user 132 and every other piece of furniture in viewing area 120. For example, the media guidance application may determine that user 136 is 7 feet away from chair 138 and at 20-degree angle.

In some embodiments, the media guidance application may determine a placement position for the avatar of actor 138 within viewing area 120. For example, the media guidance application may begin by matching a viewing angle of actor 138 with angles between empty pieces of furniture (e.g., chair 126, sofa 128) and the position of user 136. For example, the viewing angle of actor 138 may be in a range −30 degrees to 30 degrees. In some embodiments, the media guidance application may determine that an angle between user 136 and chair 126 is −20 degrees, while an angle between user 136 and sofa 128 is 45 degrees. Consequently, the media guidance application may disqualify sofa 128 as a possible placement position for actor 138, but maintain chair 126 as a possible placement position for actor 138.

In some embodiments, the media guidance application may also match the body position of actor 138 with the shape of each piece furniture. For example, the media guidance application may attempt to overlay skeletal points of actor 138 over a mesh representation of chair 126 and a mesh representation of sofa 128. In some embodiments, the media guidance application may consider chair 126 to match the body shape of actor 138 if the overlay of skeletal points of actor 138 over the mesh representation of chair 126 did not create a number of collisions that exceed a threshold. For example, the media guidance application may determine that body shape of actor 138 matches the shape of chair 126 but not the shape of sofa 128.

In some embodiments, the media guidance application may determine a placement position for supplemental AR content (e.g., for actor 138) to be at a position within viewing area 120, such that the viewing angle of the supplemental AR content matches with the position of the user such that the body position of an actor matches with the shape and position of the furniture within the viewing area.

In some embodiments, the media guidance application may then present the supplemental AR content (e.g., actor 138) in a placement position, such that actor 138 overlays a matching piece of furniture (e.g., chair 138) such that the face of actor 138 can be viewed by user 136. In some embodiments, the media guidance application may provide actor 138 for display at the same time as when the media guidance application provides a related scene of the media content on display 124.

Figure 1C:
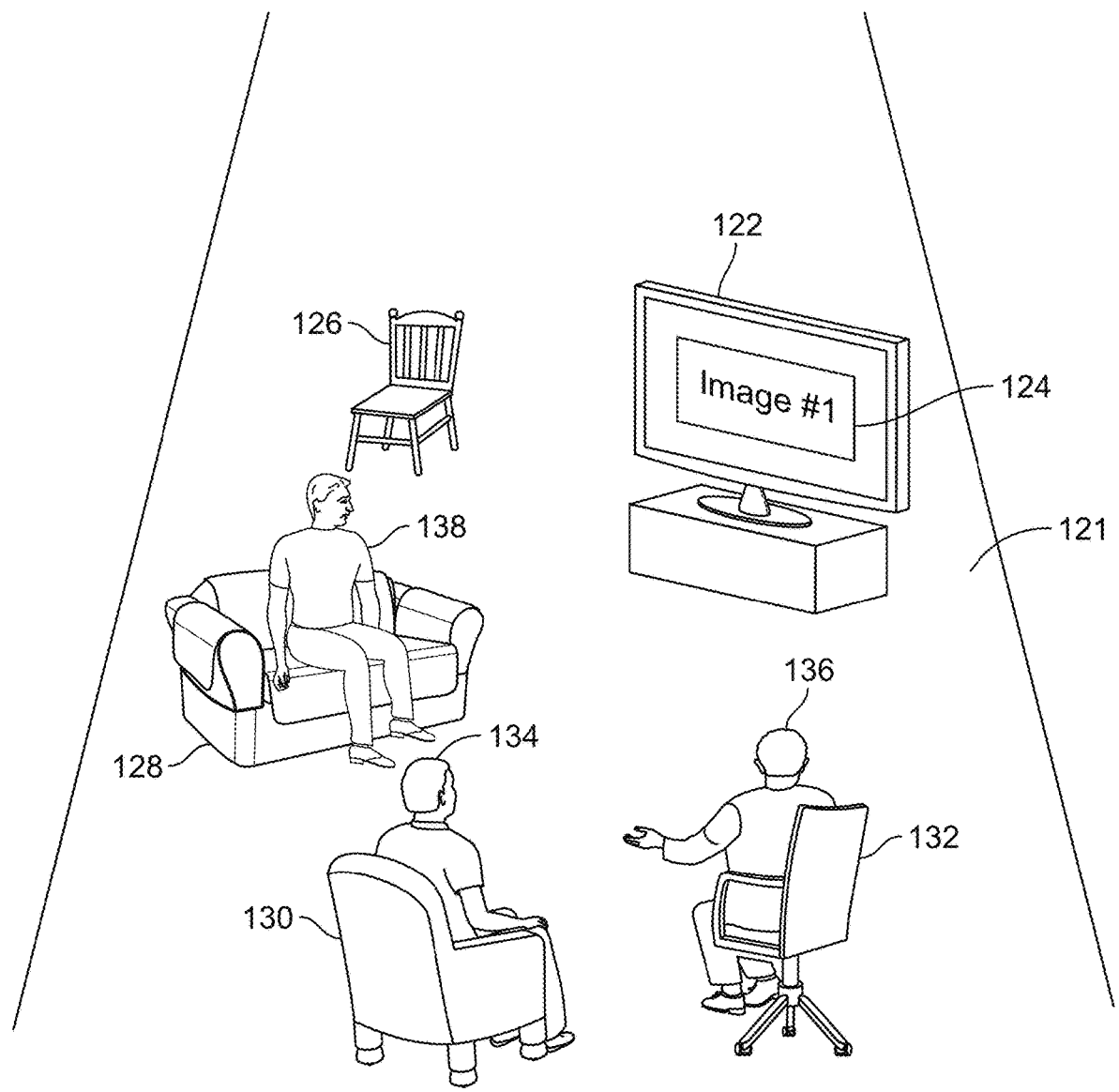
FIG. 1C shows yet another illustrative diagram of a viewing area where media content and supplemental AR content may be provided, in accordance with some embodiments of the disclosure.

FIG. 1C shows another variation of an illustrative diagram of a viewing area 120 where media content and supplemental AR content may be provided in accordance with various embodiments of the disclosure. In some embodiments, the media guidance application may determine that that there is no good placement position for the supplemental AR content within viewing area 120.

In some embodiments, the media guidance application may then modify the supplemental AR content to improve at least one of: the matching of the viewing angle of the supplemental AR content with the position of the user within the viewing area, and the matching of the body position of an actor with the shape and position of the furniture within the viewing area. For example, chair 126 may be absent from viewing area 120, and thus sofa 128 may be the only available piece of furniture. In this case, the media guidance application may, for example, rotate the avatar of actor 138 by 75 degrees, such that skeletal points of actor 138 would match the mesh of sofa 128. In some embodiments, the media guidance application may then present a rotated actor 138 for display as overlaid over sofa 148.

In some embodiments, the media guidance application may provide suggestions for placement of furniture. For example, chair 126 may be absent from viewing area 120, however the media guidance application may provide for display an AR phantom outline of chair 126, and prompt the user to place a real chair in the position indicated by the phantom outline of chair 126.

In some embodiments, the media guidance application may provide suggestions for positioning of the users. For example, user 136 may be absent from chair 132, however the media guidance application may provide for display an AR phantom human shape outline sitting in chair 132 and prompt the user to take the position of the phantom outline.

In some embodiments, the media guidance application may provide actor 138 for display in different positions for user 134 and user 136. For example, user 132 may see actor 138 in chair 126, while user 134 may see actor 138 on sofa 128. Such display may occur simultaneously for users 134 and 136. In some embodiments, the media guidance application may also adjust the sound to account for users 134 and 136 seeing actor 138 in different positions. For example, the media guidance application may adjust the sound of supplemental AR content to emanate from a position that is halfway between sofa 128 and chair 138.

Figure 2:
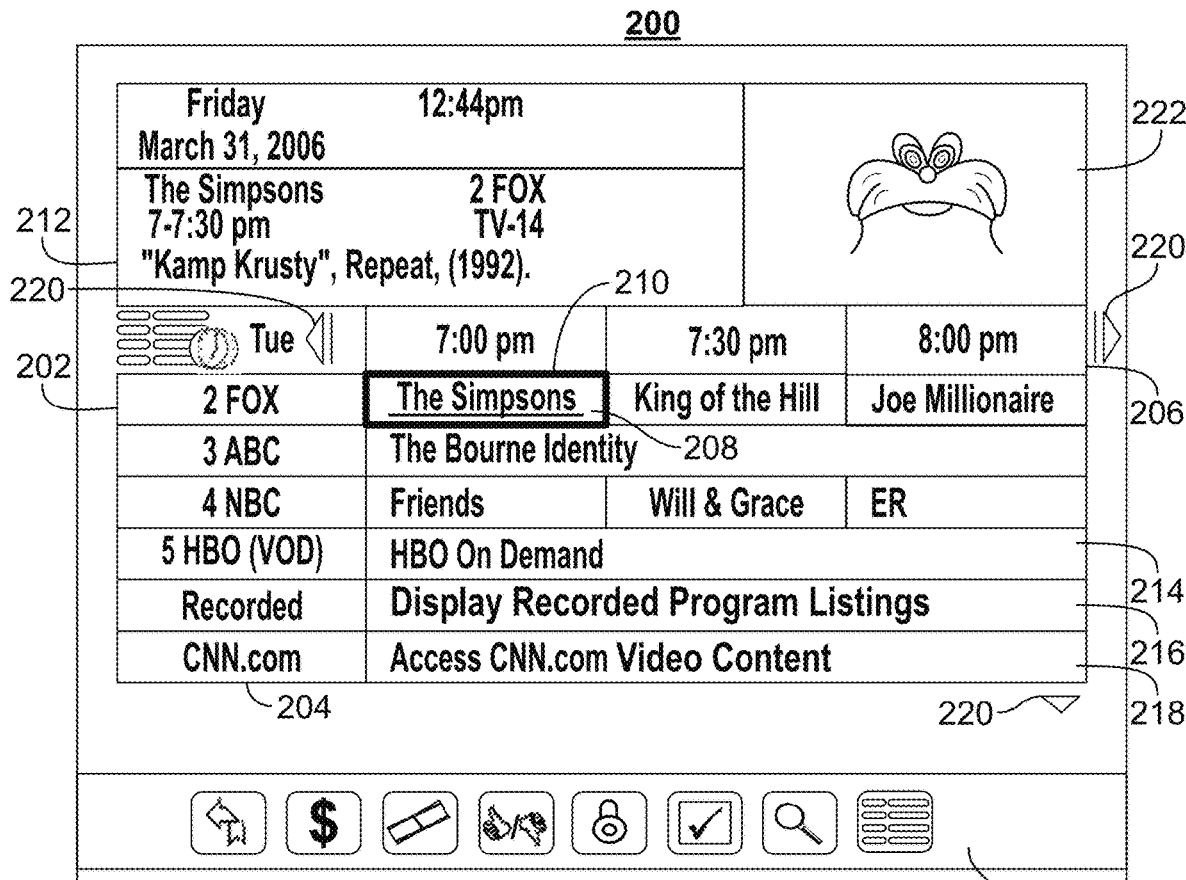
FIG. 2 shows another illustrative media guidance interface that may dynamically include or exclude a video, in accordance with some embodiments of the disclosure.
Figure 3:
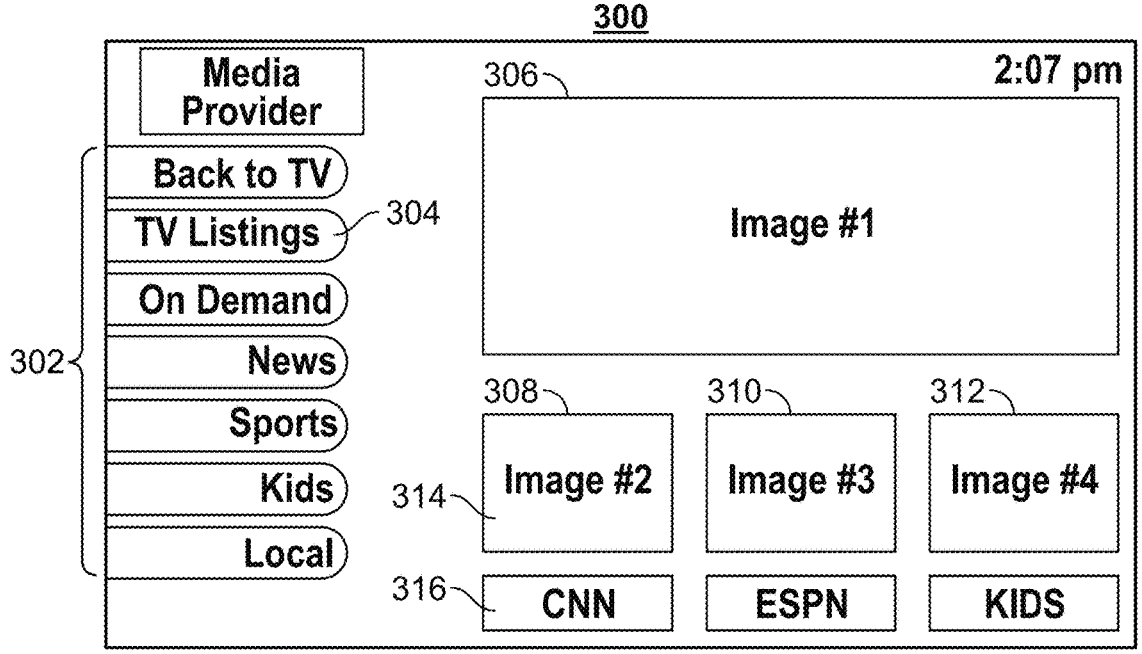
FIG. 3 shows yet another illustrative media guidance interface that may dynamically include or exclude a video, in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
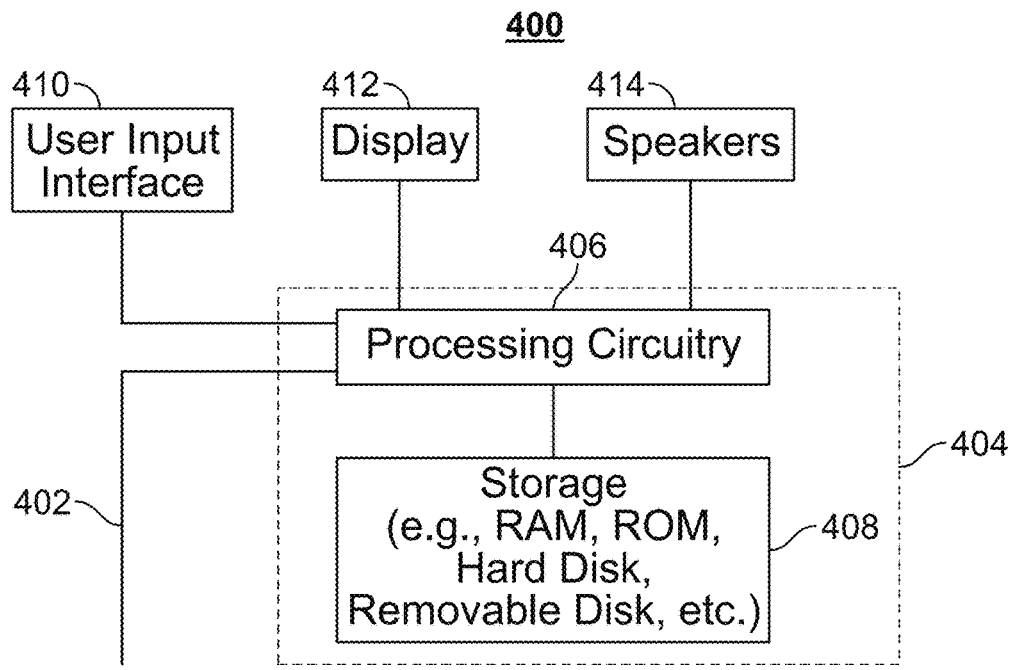
FIG. 4 is a block diagram of an illustrative user equipment device in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
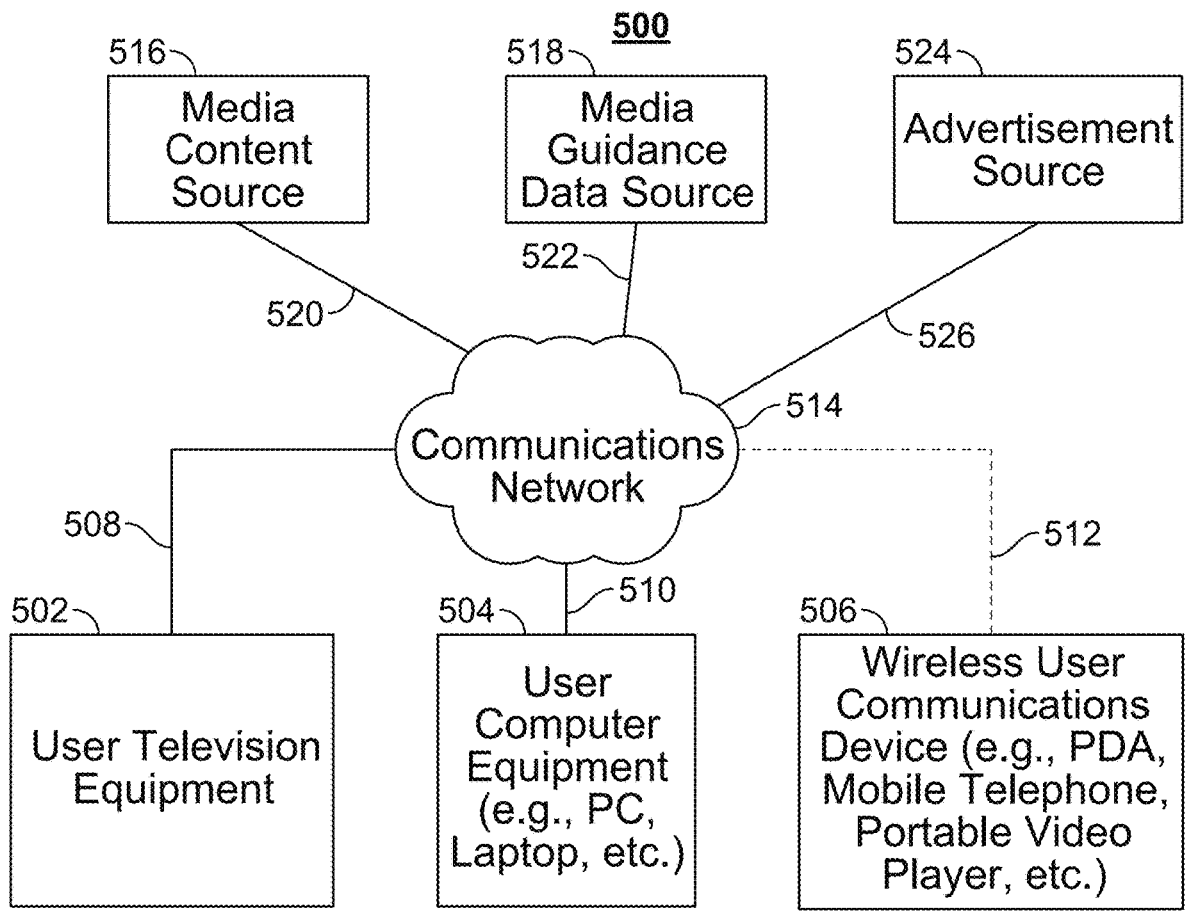
FIG. 5 is a block diagram of an illustrative media system in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

In some embodiments, a user equipment device (e.g., user television equipment 502, user computer equipment 504, wireless user communications device 506) may include device capable of augmented reality (AR) presentation of media content. For example, at least one of user television equipment 502, user computer equipment 504, wireless user communications device 506 may include AR goggles, that may be worn by the user, and may comprise a transparent or semi-transparent screen. In some embodiments, AR goggles may allow the user to, at least partially, see real-world environment, and see media content that appears overlaid over the real-world environment. In some embodiments, a user equipment device may include hardware for generating holographic 3D AR images that may be overlaid the real-world environment. In some embodiments, the device that is capable of augmented reality (AR) presentation may be controlled by control circuitry 404.

In some embodiments, a user equipment device (e.g., user television equipment 502, user computer equipment 504, wireless user communications device 506) may include video cameras or other sensors capable of sensing the real-world environment in the immediate vicinity of the user equipment device. For examine, user equipment device may capable of scanning a room and of creating 3D models of the furniture and the users who are present.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

System 500 may also include an advertisement source 524 coupled to communications network 514 via a communications path 526. Path 526 may include any of the communication paths described above in connection with paths 508, 510, and 512. Advertisement source 524 may include advertisement logic to determine which advertisements to transmit to specific users and under which circumstances. For example, a cable operator may have the right to insert advertisements during specific time slots on specific channels. Thus, advertisement source 524 may transmit advertisements to users during those time slots. As another example, advertisement source may target advertisements based on the demographics of users known to view a particular show (e.g., teenagers viewing a reality show). As yet another example, advertisement source may provide different advertisements depending on the location of the user equipment viewing a media asset (e.g., east coast or west coast).

In some embodiments, advertisement source 524 may be configured to maintain user information including advertisement-suitability scores associated with user in order to provide targeted advertising. Additionally or alternatively, a server associated with advertisement source 524 may be configured to store raw information that may be used to derive advertisement-suitability scores. In some embodiments, advertisement source 524 may transmit a request to another device for the raw information and calculate the advertisement-suitability scores. Advertisement source 524 may update advertisement-suitability scores for specific users (e.g., first subset, second subset, or third subset of users) and transmit an advertisement of the target product to appropriate users.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Detailed descriptions of FIGS. 6-10 are provided below.

Figure 6:
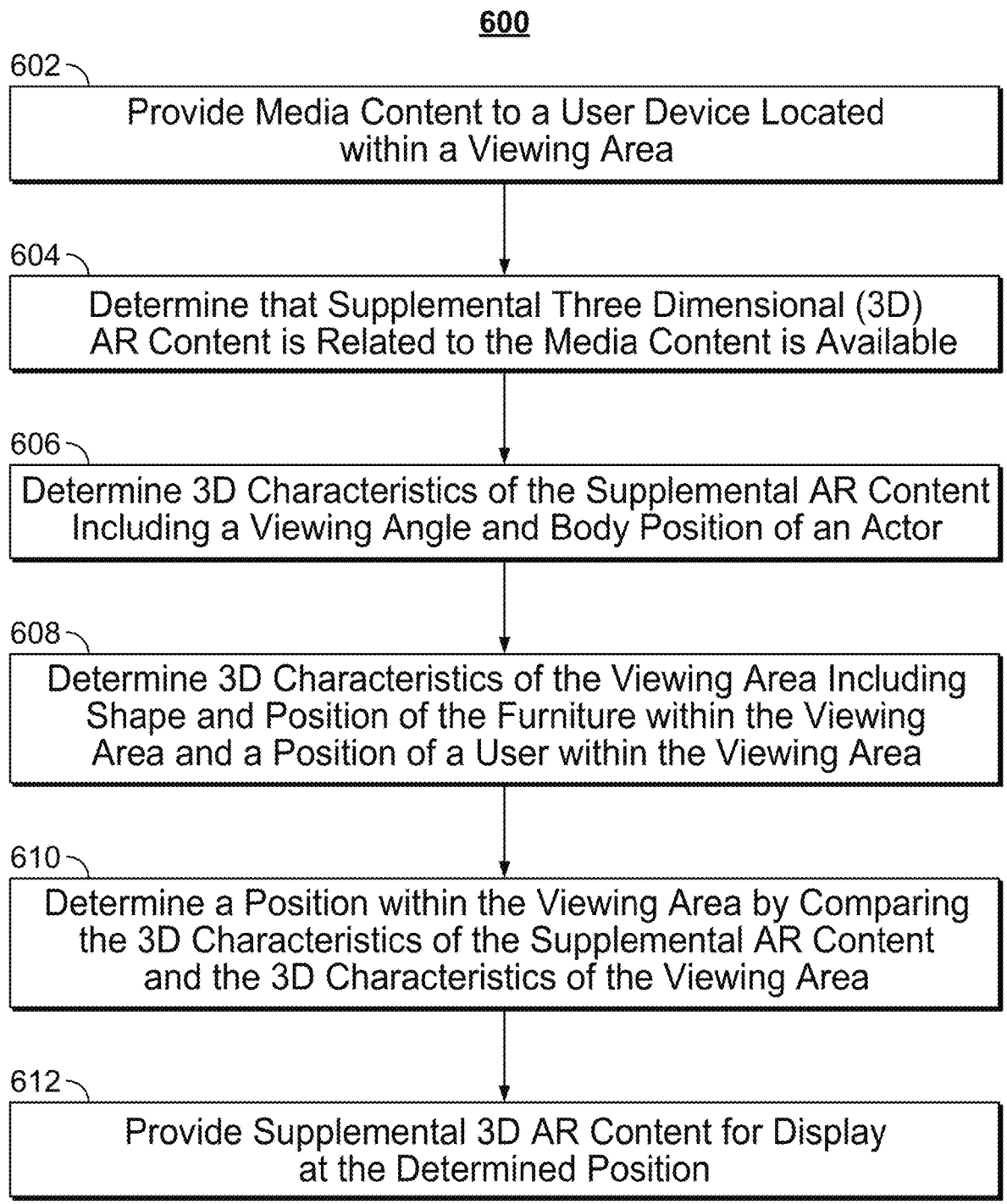
FIG. 6 depicts an illustrative flow diagram for a process for providing media content and supplemental AR content in accordance with some embodiments of the disclosure.

FIG. 6 depicts an illustrative flow diagram of a process 600 for providing media content and supplemental AR content in accordance with an embodiment of the disclosure. Process 600 may be executed by control circuitry 404 (e.g., in a manner instructed to control circuitry 404 by the media guidance application). Control circuitry 404 may be part of user equipment (e.g., user television equipment 502, user computer equipment 504, and/or wireless communications device 506), or of a remote server separated from the user equipment by way of communications network 514.

Process 600 begins at 602, where control circuitry 404 provides media content to the user device located within a viewing area (e.g., viewing area 120 of FIGS. 1B and 1C). For example, the media guidance application running on control circuitry 404 may generate media content for display on a display 412 of user television equipment 502. The media content may be generated for display by way of an explicit user selection to play the video, as a result of the user equipment being powered on, or by any other triggering events.

Process 600 continues to 604, where control circuitry 404 may determine that supplemental three dimensional (3D) AR content related to the media content is available. For example, control circuitry 404 may determine that metadata of supplemental AR content matches metadata of content provided at block 602.

In some embodiments, control circuitry 404 may extract a portion of the media content and transform it into supplemental AR content. For example, if the media content is the movie "Matrix," control circuitry 404 may extract an object (e.g., a bullet shown in "Neo Bullet-time Scene") depicted in a movie and transform it into supplemental AR content. For example, since a bullet shown in "Neo Bullet-time Scene" is depicted from multiple angles, control circuitry 404 may use that information to create a 3D model of the bullet. That 3D model can then be treated as a type of supplemental AR content which may displayed overlaid over the physical environment of the user in accordance to embodiments described above and below.

Process 600 continues to 606, where control circuitry 404 determines 3D characteristics of the supplemental AR content including a viewing angle and body position of an actor. For example, viewing angle and body position of actor 138 may be determined as described in connection with FIGS. 1B and 1C.

Process 600 continues to 608, where control circuitry 404 determines 3D characteristics of the viewing area including shape and position of the furniture within the viewing area and a position of a user within the viewing area. For example, control circuitry 404 may measure the height, width and depth of each physical object in the viewing area to determine characteristics of that object. In some embodiments, control circuitry 404 may generally identify an object and then reference a database of object to determine that object's shape. For example, control circuitry 404 may identify a chair (e.g., chair 132) as a specific model of chair produced by a specific manufacturer (e.g., La-Z-Boy Chair Model 37T). In some embodiments, control circuitry 404 may then reference a database to retrieve a shape of that chair. For example, control circuitry 404 may retrieve height, width and depth of La-Z-Boy Chair Model 37T. In some embodiments, control circuitry 404 may determine characteristics of chairs 126, 130, and 132 and sofa 128 within viewing area 120 in the manner described in connection with FIGS. 1B and 1C.

Process 600 continues to 610, where control circuitry 404 may determine a position within the viewing area by comparing the 3D characteristics of the supplemental AR content and the 3D characteristics of the viewing area. For example, control circuitry 404 may match 3D characteristics of the supplemental AR content (e.g., actor 138 of FIGS. 1B and 1C) with 3D characteristics of a room where the media content is provided (e.g., viewing area 120 of FIGS. 1B and 1C). In some embodiments, control circuitry 404 may determine the position based on which position in the viewing area matches the supplemental AR content the best.

Process 600 continues to 612, where control circuitry 404 may provide supplemental AR content for display at the determined position. For example, control circuitry 404 may overlay an actor (e.g., actor 138) over a piece of furniture in the viewing area (e.g., viewing area 120) such that that the actor is viewable to a user who is also located within the viewing area (e.g., viewing area 120). In some embodiments, control circuitry 404 may determine the position based on matching the lighting level of the supplemental AR content and the lighting level of that part of the viewing area. For example, a brightly lit actor may be placed in a well-lit part of the room.

Figure 7:
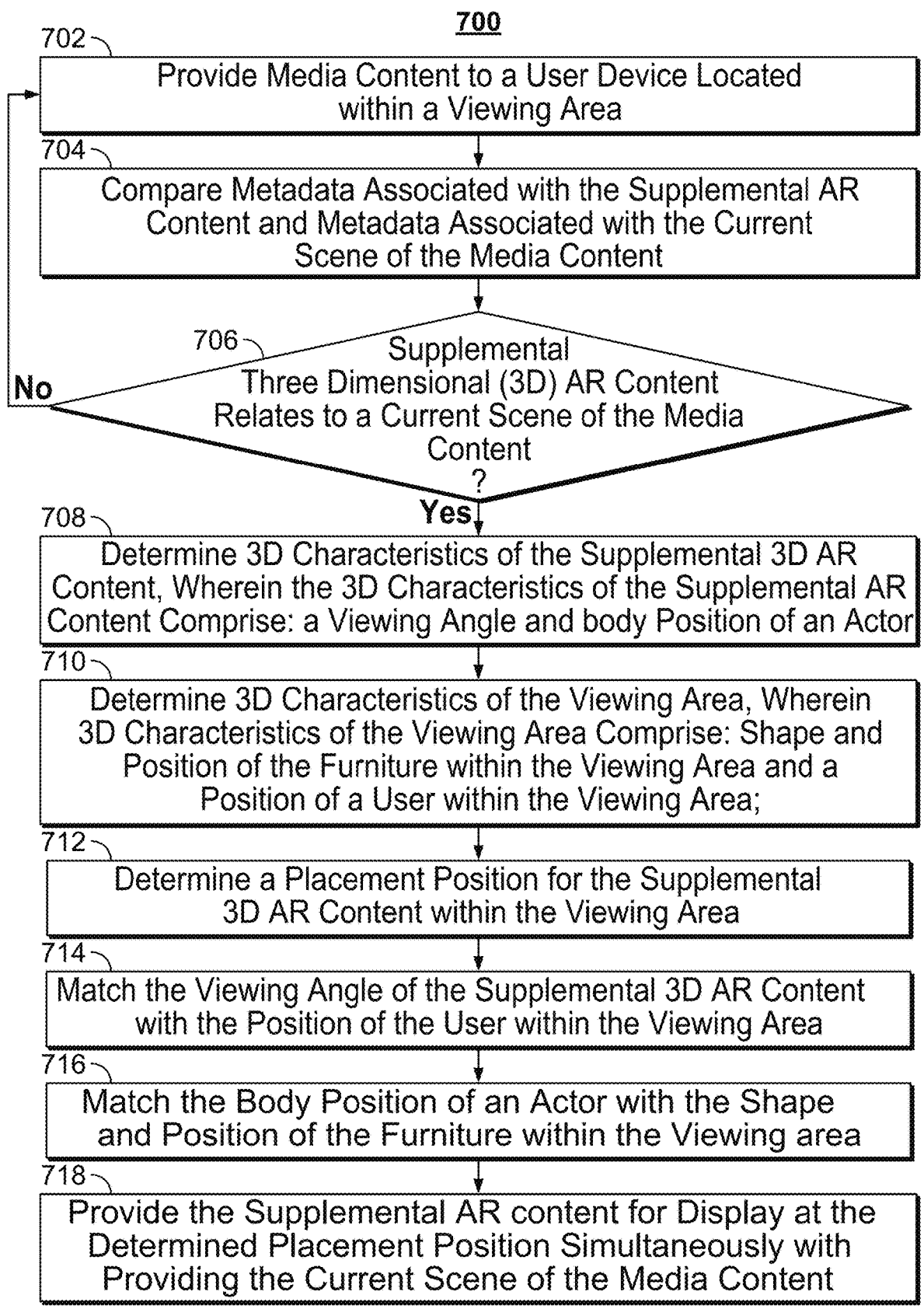
FIG. 7 depicts an illustrative flow diagram for a process for simultaneously providing media content and supplemental AR content accordance with some embodiments of the disclosure.

FIG. 7 depicts an illustrative flow diagram of a process 700 for simultaneously providing media content and supplemental AR content in accordance with an embodiment of the disclosure. Process 700 may be executed by control circuitry 404 (e.g., in a manner instructed to control circuitry 404 by the media guidance application). Control circuitry 404 may be part of user equipment (e.g., user television equipment 502, user computer equipment 504, and/or wireless communications device 506), or of a remote server separated from the user equipment by way of communications network 514.

Process 700 begins at 702, where control circuitry 404 provides media content to the user device located within a viewing area (e.g., viewing area 120 of FIGS. 1B and 1C). For example, the media guidance application running on control circuitry 404 may generate media content for display on a display 412 of user television equipment 502. The media content may be generated for display by way of an explicit user selection to play the video, as a result of the user equipment being powered on, or by any other triggering events.

Process 700 continues to 704, where control circuitry 404 may compare metadata associated with the supplemental AR content and metadata associated with the current scene of the media content to determine whether the supplemental AR content relates to a current scene of the media content.

In some embodiments, control circuitry 404 may analyze metadata related to a particular scene of the media content. For example, each scene of the media content may have related metadata identifying, for example, title of the scene, type of the scene (action, conversation, exposition, panorama), actors present in the scene, any other type of metadata, or any combination thereof. In some embodiments, control circuitry 404 may match a particular scene of the media content to supplemental AR content based on comparing the metadata of the scene and metadata of the supplemental AR content. For example, "Neo Bullet-time Scene" from the "Matrix" movie can have associate metadata that identifies this scene (e.g., "Neo Bullet-time Scene"), metadata that identifies timing of that scene within the movie "Matrix" (e.g., "25 minutes 30 seconds-32 minutes 35 seconds"), metadata that identifies actors involved in the scene (e.g., "Keanu Reeves"). Supplemental AR content may similarly include metadata like title (e.g., "Lana Wachowski discusses the Neo Bullet-time Scene"), subject matter (e.g., "Director commentary"), timestamps identifying what part of the media content it's relevant to (e.g., "25 minutes 30 seconds-30 minutes 00 seconds"). In one example, control circuitry 404 may determine that supplemental AR content matches "Neo Bullet-time Scene" from the movie "Metrix" because the title of supplemental AR content explicitly references the description of that scene. In one example, control circuitry 404 may determine that supplemental AR content matches "Neo Bullet-time Scene" from the "Matrix" because it references the same actor (e.g., "Keanu Reeves") and the same time in the movie (e.g., "25 minutes 30 seconds.").

Process 700 continues to 706, where control circuitry 404 may take different paths based on the outcome of the comparison performed in block 704. In some embodiments, if the supplemental AR content relates to a current scene of the media content, process 700 may proceed to block 708. In some embodiments, if the supplemental) AR content does not relate to a current scene of the media content, process 700 may proceed to block 702 and continue providing the media content. Steps 704 and 706 may then be repeated for the next scene of the media content.

Process 700 may continue to 708, where control circuitry 404 may determine 3D characteristics of the supplemental AR content, wherein the 3D characteristics of the supplemental AR content comprise: a viewing angle and body position of an actor in the supplemental AR content. For example, control circuitry 404 may determine a viewing angle of an actor (e.g., actor 138) as described in relation to FIGS. 1B and 1C. In another example, control circuitry 404 may determine body position of an actor (e.g., actor 138) as described in relation to FIGS. 1B and 1C.

Process 700 may continue to 710, where control circuitry 404 may determine 3D characteristics of the viewing area, wherein 3D characteristics of the viewing area comprise: shape and position of the furniture within the viewing area and a position of a user within the viewing area. For example, control circuitry 404 may determine shape and position of chairs (e.g., chairs 126, 130, and 132), sofas (e.g., sofa 128) and any other pieces of furniture in the viewing area as described in relation to FIGS. 1B and 1C. In some embodiments, control circuitry 404 may also identify a position of a user (e.g., user 136) within the viewing area as described in relation to FIGS. 1B and 1C.

Process 700 continue to 712, where control circuitry 404 may determine a placement position for the supplemental AR content within the viewing area. For example, control circuitry 404 may identify a position within the viewing area, such that an actor of the supplemental AR content is overlaid over an existing piece of furniture within the viewing area, and such that the user can see the face of the actor in the supplemental AR content. In some embodiments, the determination may be performed in two steps as described in optional blocks 714 and 716. In some embodiments, control circuitry 404 may determine the placement position based on matching the lighting level of the supplemental AR content and the lighting level of that part of the viewing area. For example, a brightly lit actor may be placed in a well-lit part of the room. In some embodiments, control circuitry 404 may determine a placement position for the supplemental AR content based on matching any kind of features of the supplemental AR content with corresponding features of the viewing area.

In some embodiments, process 700 may continue to 714, where control circuitry 404 may match the viewing angle of an actor from the supplemental AR content with the position of the user within the viewing area. For example, control circuitry 404 may identify sub-areas of the viewing area where the actor (e.g., actor 138) may be placed such that user (e.g., user 136) may be able to see the actor's face. In some embodiments, control circuitry 404 may identify all pieces of furniture located in sub-areas of the viewing area (e.g., chair 126 and sofa 128). In some embodiments, control circuitry 404 may match the viewing angle of the actor from the supplemental AR content with the position of the user within the viewing area in a way described in relation to FIGS. 1B and 1C.

In some embodiments, process 700 may continue to 716, where control circuitry 404 may matching the body position of the actor with the shape and position of the furniture pieces within the viewing area. In some embodiments, control circuitry 404 may only attempt to match the body position of an actor (e.g., actor 138) with the shapes of the furniture pieces (e.g., chair 126 and sofa 128) in the sub-areas identified at block 714. In some embodiments, control circuitry 404 may proportionally scale the body of the actor to match furniture pieces identified at block 714. For example, control circuitry 404 may proportionally reduce the size of an actor by 10 percent, if the actor was too large to fit into a chair (e.g., chair 126). In some embodiments, control circuitry 404 may try to match the body position of an actor with the shape and position of each furniture piece in a way described in relation to FIGS. 1B and 1C.

In some embodiments, process 700 may, in block 712, determine the placement positions for the supplemental AR content based on a user profile of a user (e.g., user 136) or of all users present in the viewing area (e.g., users 134 and 136). For example, control circuitry 404 may retrieve the user profile for each from storage 408. In some embodiments, the user profile may store the user's preferred actors. For example, the user's (e.g., user 134) profile may include notation that the user is a fan of Keanu Reeves, while another user's (e.g., user 136) profile may lack such a notation. In some embodiments, control circuitry 404 may determine the placement positions for the actor from supplemental AR content by trying to account for actor preferences from the user profile. For example, control circuitry 404 may place an avatar of Keanu Reeves closer to user 136 because user 136 is a fan of Keanu Reeves.

In some embodiments, the user profile may include the user's preference as to which furniture may or may not be used to present AR content. For example, the user profile may include a notation that a certain piece of furniture (e.g., sofa 128) may not be used to present AR content. In such example, control circuitry 404 will exclude the identified piece of furniture from consideration as a possible placement position for the supplemental AR content. For example, control circuitry 404 may never consider sofa 128 as a possible placement position for the supplemental AR content because sofa 128 is explicitly marked, by the user, as excluded from presentation of AR content.

Process 700 continues to 718, where control circuitry 404 may provide the supplemental AR content for display at the determined placement position simultaneously with providing the current scene of the media content. For example, control circuitry 404 may continue providing media content on a 2D display, while also proving 3D supplemental AR content (e.g., actor 138) as overlaid over one of the real pieces of furniture in the viewing area (e.g., viewing area 120). For example, control circuitry 404 may send an image of the supplemental AR content to AR goggles worn by the user, and instruct the goggles to display the supplemental AR content overlaid over the physical area surrounding the user. For example, control circuitry 404 may instruct the AR goggles to display an actor from the supplemental AR content in the determined placement position.

In some embodiments, control circuitry 404 may display supplemental AR content simultaneously for several users (e.g., users 134 and 136). In such cases, control circuitry 404 may synchronize AR goggles of the multiple users. For example, control circuitry 404 may send synchronization signal to AR goggles worn by a first user (e.g., user 134) and to AR goggles worn by a second user (e.g., user 136). In some embodiments, the synchronization signal may reference a global clock. For example, control circuitry 404 may instruct both pairs of AR goggles to begin presentation of supplemental AR content at the same time with reference to a global clock.

Figure 8:
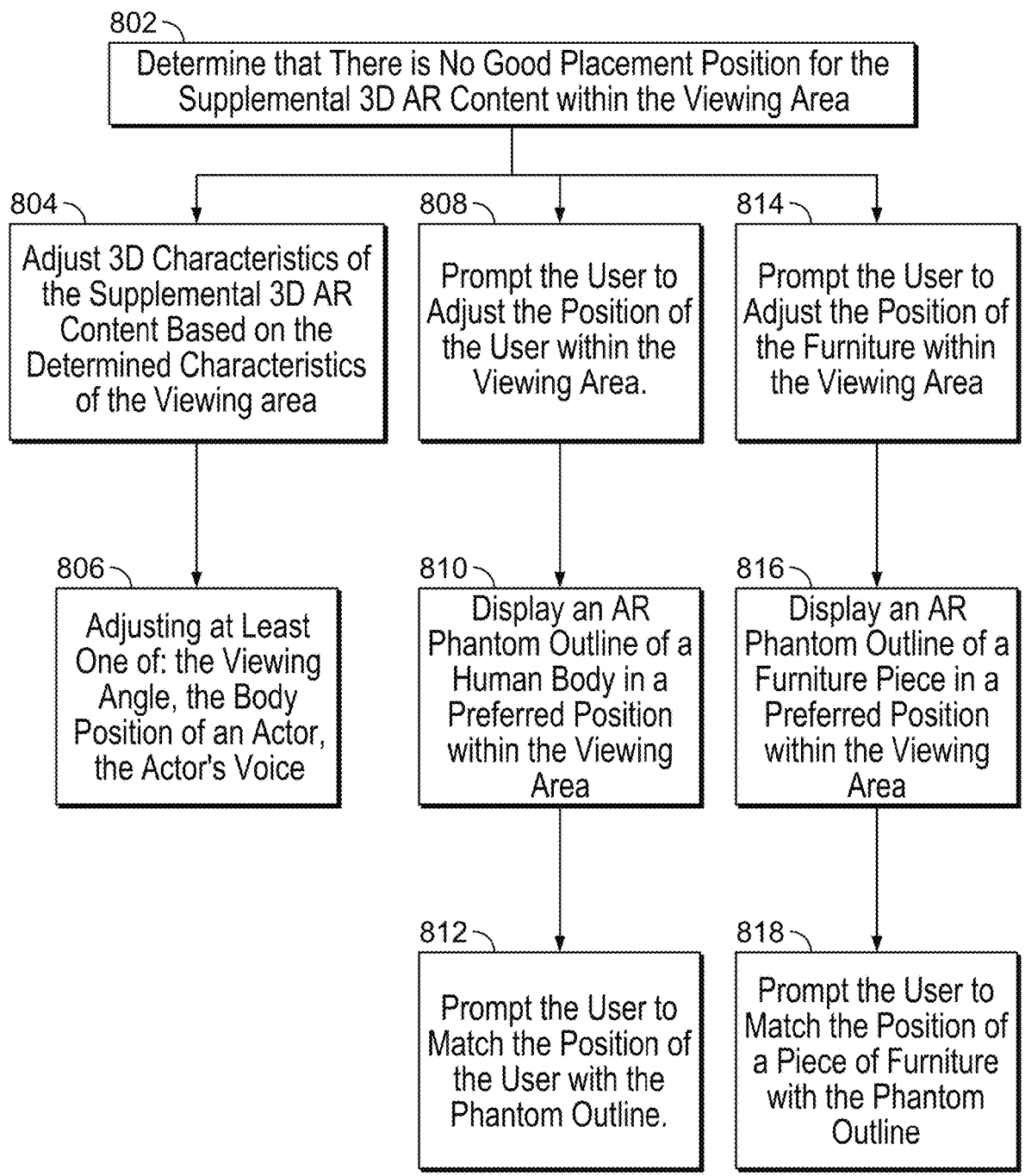
FIG. 8 depicts an illustrative flow diagram for a process for making adjustments when there is no good placement position for the supplemental AR content within the viewing area in accordance with some embodiments of the disclosure.

FIG. 8 depicts an illustrative flow diagram of a process 800 for making adjustments when there is no good placement position for the supplemental AR content within the viewing area in accordance with some embodiments of the disclosure. Process 800 may be executed by control circuitry 404 (e.g., in a manner instructed to control circuitry 404 by the media guidance application). In some embodiments, control circuitry 404 may perform process 800 as a part of block 712 described in relation to FIG. 7.

In some embodiments, control circuitry 404 may determine (e.g., at block 712) that there is no good placement position for the supplemental AR content within the viewing area. For example, there was no position in the viewing area (e.g., viewing area 120) such that the angle of the supplemental AR content could be matched with the position of the user, and such that body position of an actor could be matched with the shape and position of the furniture within the viewing area. In some embodiments, control circuitry 404 may then perform at least one of step sequences 804-806, 808-812, and 814-818. In some embodiments, some or all of these step sequences may be performed either sequentially or in parallel.

In some embodiments, process 800 may continue to block 804 after block 802, where control circuitry 404 may adjust 3D characteristics of the supplemental AR content based on the determined characteristics of the viewing area. Optionally, control circuitry 404 may adjust 3D characteristics of the supplemental AR content at block 806. In some embodiments, control circuitry 404 may adjust the lighting level of the supplemental AR content to better match the lighting level of the viewing area. For example, if the supplemental AR content is dimly lit, while the viewing area is bright, control circuitry 404 may lower the brightness of the supplemental AR content.

In some embodiments, process 800 may continue to block 806 after block 804, where, for example, control circuitry 404 may proportionally scale the actor (e.g., actor 138) from the supplemental AR content. In another example, control circuitry 404 may rotate the actor (e.g., actor 138) from the supplemental AR content. In another example, control circuitry 404 may adjust the body position of the actor (e.g., actor 138) from the supplemental AR content. In some embodiments, such adjustments are performed in such a way as to improve at least one of the matching of the viewing angle of the supplemental AR content with the position of the user within the viewing area, and the matching of the body position of an actor with the shape and position of the furniture within the viewing area.

In some embodiments, process 800 may continue to block 808 after block 802, where control circuitry 404 may prompt the user to adjust the position of the user within the viewing area. For example, control circuitry 404 may present a text or an audio prompt to the user to sit in a particular piece of furniture in the viewing area. Optionally, control circuitry 404 may also perform steps 810-812.

In some embodiments, process 800 may continue to block 810 after block 808, where control circuitry 404 may display an AR phantom outline of a human body (e.g., the outline of a user 136) in a preferred position within the viewing area (e.g., on chair 136). In some embodiments, control circuitry 404 may display the phantom outline of a human body in a way described in relation to FIG. 1C.

In some embodiments, process 800 may continue to block 812 after block 810, where control circuitry 404 may prompt the user to match his or her position with the phantom outline. For example, control circuitry 404 may issue a voice or text prompt asking the user to sit where the phantom AR outline is displayed.

In some embodiments, process 800 may continue to block 814 after block 802, where control circuitry 404 may prompt the user to adjust the position of the furniture within the viewing area. For example, control circuitry 404 may prompt the user to move a chair (e.g., chair 126) into a better position within the viewing area. Optionally, control circuitry 404 may also perform steps 816-818.

In some embodiments, process 800 may continue to block 810 after block 808, where control circuitry 404 may display an AR phantom outline of a furniture piece in a preferred position within the viewing area. For example, control circuitry 404 may display a phantom outline of a chair (e.g., chair 126) within a preferred position of the viewing area (e.g., viewing area 120). In some embodiments, control circuitry 404 may display the phantom outline of a chair in a way described in relation to FIG. 1C.

In some embodiments, process 800 may continue to block 818 after block 816, where control circuitry 404 may prompt the user to move a real chair into the area marked by the phantom outline of a chair. For example, control circuitry 404 may issue a voice or text prompt asking the user to move a chair into a position indicated by the phantom outline of a chair.

FIG. 9 depicts an illustrative flow diagram of a process 900 for providing adjusted sound of the supplemental AR content in accordance with some embodiments of the disclosure. Process 900 may be executed by control circuitry 404 (e.g., in a manner instructed to control circuitry 404 by the media guidance application). In some embodiments, control circuitry 404 may perform process 900 as a part of block 718 described in relation to FIG. 7.

Process 900 begins at 902, where control circuitry 404 may identify a plurality of respective positions of a plurality of users within the viewing area. For example, control circuitry 404 may determine that multiple users (e.g., users 134 and 136) are present in the viewing area (e.g., viewing area 120.) In some embodiments, control circuitry 404 may then identify a position of each user of the plurality of users.

Process 900 continues to 904, where control circuitry 404 may determine a plurality of respective placement positions for the supplemental AR content within the viewing area for each user of the plurality of users. For example, for each user, control circuitry 404 may determine a placement position for the supplemental AR content in way similar to determining a placement position as described in block 712 of FIG. 7.

Process 900 continues to 906, where control circuitry 404 may adjust the sound of the supplemental AR content based on the plurality of respective placement positions. For example, control circuitry 404 may determine a location of a center point between the plurality of respective placement positions. In some embodiments, control circuitry 404 may then adjust the sound of the supplemental AR content to seem to emanate from the determined center point.

Process 900 continues to 908, where control circuitry 404 may simultaneously provide the supplemental AR content for display at each of the plurality of placement positions. For example, one user (e.g., user 136) may be able to see supplemental AR content at one location, simultaneously with another user (e.g., user 134) being able to see supplemental AR content at another location. In some embodiments, control circuitry 404 may also simultaneously continue providing the current scene of the media content to the user device. For example, both users (e.g., users 134 and 136) may be able to see the same media content on the same user device (e.g., display 122).

Process 900 continues to 908, where control circuitry 404 may provide the adjusted sound of the supplemental AR content simultaneously with providing the current scene of the media content to the user device. For example, both users (e.g., users 134 and 136) may able to hear the adjusted sound emanate from the same location.

FIG. 10 depicts an illustrative flow diagram of a process 1000 for pausing the providing of the media content in accordance with some embodiments of the disclosure. Process 1000 may be executed by control circuitry 404 (e.g., in a manner instructed to control circuitry 404 by the media guidance application). In some embodiments, control circuitry 404 may perform, process 900 as a part of block 718 described in relation to FIG. 7.

Process 1000 begins at 1002, where control circuitry 404 may display a prompt to the user to pause the media content in response to determining that the supplemental AR content relates to the current scene of the media content. For example, if the movie "Matrix" is playing and the current scene is "Neo bullet-time Scene," control circuitry 404 may determine that supplemental AR content "Keanu Reeves explains Neo bullet-time Scene" is available. In some embodiments, control circuitry 404 may then display a prompt to the user to pause the media content before "Neo bullet-time Scene." For example, control circuitry 404 may generate for display a message "Do you wish to pause the movie playback to view supplemental AR content?"

Process 1000 continues at 1004, where control circuitry 404 may pause the providing of the media content, in response to receiving a user response to the prompt. For example, if the user responds with a confirmation, control circuitry 404 may pause the playback of movie "Matrix."

Process 1000 continues at 1006, where control circuitry 404 may provide the supplemental AR content for display before the current scene, in response to receiving a user response to the prompt. For example, if the user responds with a confirmation, control circuitry 404 may provide for display the supplemental AR content "Keanu Reeves explains Neo Bullet-time Scene." In some embodiments, control circuitry 404 may display a still image from the current scene on the user device, while the supplemental AR content is provided.

Process 1000 continues at 1008, where control circuitry 404 may resume providing of the media content at the beginning of the current scene after the supplemental content AR concludes. For example, once control circuitry 404 finishes providing supplemental AR content "Keanu Reeves explains Neo Bullet-time Scene," control circuitry 404 may resume providing the "Matrix" movie on the user device.

It should be noted that processes 600-1000, or any step thereof, could be performed on, or provided by, any of the devices shown in, or described with respect to, FIGS. 4-5.

For example, either process 600 or process 700 may be executed by control circuitry 404 (FIG. 4) as instructed by media guidance application(s) implemented on user equipment 502, 504, and 506 (FIG. 5). In addition, one or more steps of processes 600 and 700 may be incorporated into, or combined with, one or more steps of any other process or embodiment.

It is contemplated that the steps or descriptions of each of FIGS. 6-10 may be used with any other embodiment of this disclosure. It is contemplated that some steps or descriptions of each of FIGS. 6-10 may be optional and may be omitted in some embodiments. In addition, the steps and descriptions described in relation to FIGS. 6-10 may be done in alternative order or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 4-5 could be used to perform one or more of the steps in FIGS. 6-10.

It will be apparent to those of ordinary skill in the art that methods involved in the present disclosure may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. The processing circuitry, for instance, may be a general purpose processor, a customized integrated circuit (e.g., an ASIC), or a field-programmable gate array (FPGA) within user equipment 400, media content source 516, or media guidance data source 518.

The processes discussed above in FIGS. 6-10 are intended to be illustrative and not limiting. One skilled in the art would appreciate that the steps of the processes in FIGS. 6-10 discussed herein may be omitted, modified, combined, and/or rearranged, and any additional steps may be performed without departing from the scope of the disclosure. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method for providing supplemental Augmented Reality (AR) content, the method comprising:
   determining a supplemental three-dimensional (3D) AR figure related to a content item, wherein the supplemental 3D AR figures comprises a representation of an actor's body;
   identifying furniture within a viewing area, wherein the furniture is not a display screen of a device;
   determining a first placement position within the viewing area for the supplemental 3D AR figure over the furniture, such that the representation of the actor's body of the supplemental 3D AR figure occupies the furniture, based on shape and position of the furniture within the viewing area, a body position of the representation of the actor's body of the supplemental 3D AR figure, and a first position of the device within the viewing area, wherein determining the first placement position comprises:
      determining, based on a first angle of the first position of the device within the viewing area, the first placement position; and
      determining, based on a second angle of a second position of the device within the viewing area, a second placement position; and
   providing for display the supplemental 3D AR figure in the first placement position.

2. The method of claim 1, wherein providing for display the supplemental 3D AR figure in the first placement position comprises providing for simultaneous display a current scene of the content item and the supplemental 3D AR figure.

3. The method of claim 1, wherein determining the supplemental 3D AR figure related to the content item comprises determining that a current scene of the content item is related to the supplemental 3D AR figure.

4. The method of claim 3, wherein determining that the current scene is related to the supplemental 3D AR figure comprises comparing metadata of the current scene to metadata of the supplemental 3D AR figure.

5. The method of claim 3, wherein determining that the current scene is related to the supplemental 3D AR figure comprises determining, based on a timestamp identifying the current scene, that the supplemental 3D AR figure is available at the timestamp.

6. The method of claim 1, wherein identifying furniture within the viewing area comprises determining the shape and position of the furniture.

7. The method of claim 1, wherein providing for display the supplemental 3D AR figure in the first placement position comprises:
   in response to the device being at the first angle, providing for display the supplemental 3D AR figure in the first placement position; and
   in response to the device being at the second angle, providing for display the supplemental 3D AR figure in the second placement position.

8. The method of claim 1, further comprising:
   determining there is no good placement position for the supplemental 3D AR content within the viewing area; and
   in response to determining there is no good placement position, prompting the user to adjust the position of the furniture within the viewing area.

9. The method of claim 8, further comprising:
   providing for display an AR phantom outline of the furniture in a preferred position within the viewing area; and prompting the user to align the furniture within the viewing area to the AR phantom outline in the preferred position.

10. A system for providing supplemental Augmented Reality (AR) content, the system comprising:
control circuitry configured to:
determine a supplemental three-dimensional (3D) AR figure related to a content item, wherein the supplemental 3D AR figure comprises a representation of an actor's body;
identify furniture within a viewing area, wherein the furniture is not a display screen of a device; and
determine a first placement position within the viewing area for the supplemental 3D AR figure over the furniture, such that the representation of the actor's body of the supplemental 3D AR figure occupies the furniture, based on shape and position of the furniture within the viewing area, a body position of the representation of the actor's body of the supplemental 3D AR figure, and a first position of the device within the viewing area, wherein the control circuitry is configured to determine the first placement position by:
determining, based on a first angle of the first position of the device within the viewing area, the first placement position; and
determining, based on a second angle of a second position of the device within the viewing area, a second placement position; and
output circuitry configured to provide for display the supplemental 3D AR figure in the first placement position.

11. The system of claim 10, wherein the output circuitry is configured to provide for display the supplemental 3D AR figure in the first placement position by providing for simultaneous display a current scene of the content item and the supplemental 3D AR figure.

12. The system of claim 10, wherein the control circuitry is configured to determine the supplemental 3D AR figure related to the content item by determining that a current scene of the content item is related to the supplemental 3D AR figure.

13. The system of claim 12, wherein the control circuitry is configured to determine that the current scene is related to the supplemental 3D AR figure by comparing metadata of the current scene to metadata of the supplemental 3D AR figure.

14. The system of claim 12, wherein the control circuitry is configured to determine that the current scene is related to the supplemental 3D AR figure by determining, based on a timestamp identifying the current scene, that the supplemental 3D AR figure is available at the timestamp.

15. The system of claim 10, wherein the control circuitry is configured to identify furniture within the viewing area by determining the shape and position of the furniture.

16. The system of claim 10, wherein the output circuitry is configured to provide for display the supplemental 3D AR figure in the first placement position by:
in response to the device being at the first angle, providing for display the supplemental 3D AR figure in the first placement position; and
in response to the device being at the second angle, providing for display the supplemental 3D AR figure in the second placement position.

17. The system of claim 10, wherein the control circuitry is further configured to:
determine there is no good placement position for the supplemental 3D AR content within the viewing area; and
in response to determining there is no good placement position, prompt the user to adjust the position of the furniture within the viewing area.

18. The system of claim 17, wherein:
the output circuitry is further configured to provide for display an AR phantom outline of the furniture in a preferred position within the viewing area; and
the control circuitry is further configured to prompt the user to align the furniture within the viewing area to the AR phantom outline in the preferred position.

* * * * *